United States Patent [19]

Chang

[11] Patent Number: 4,796,131
[45] Date of Patent: Jan. 3, 1989

[54] HEAD POSITIONER PRELOADED STOP

[75] Inventor: David D. Chang, Sherman Oaks, Calif.

[73] Assignee: Micropolis Corporation, Chatsworth, Calif.

[21] Appl. No.: 107,369

[22] Filed: Oct. 9, 1987

[51] Int. Cl.⁴ .............................................. G11B 5/55
[52] U.S. Cl. .................................................... 360/106
[58] Field of Search ........................ 360/86, 97–99, 360/104, 105, 106, 109, 130–134, 137; 310/10–12

[56] References Cited

U.S. PATENT DOCUMENTS

| | | | |
|---|---|---|---|
| 4,110,802 | 8/1978 | Ho et al. | 360/106 |
| 4,131,921 | 12/1978 | Gruczelak | 360/137 |
| 4,346,416 | 8/1982 | Riggle et al. | 360/97 X |
| 4,635,151 | 1/1987 | Hazebrouck | 360/105 |
| 4,706,142 | 11/1987 | Hattori et al. | 360/105 |

FOREIGN PATENT DOCUMENTS 0135483  8/1982  Japan .................................. 360/105

OTHER PUBLICATIONS

Pertec, Mini Wini, May 1980.

*Primary Examiner*—John H. Wolff
*Assistant Examiner*—Andrew L. Sniezek
*Attorney, Agent, or Firm*—Poms, Smith, Lande & Rose

[57] ABSTRACT

A Winchester or hard disk drive, with a head positioner rotor is provided with a bidirectional preloaded stop. The head positioner rotor is provided with a plate having two spaced stop surfaces, both of which engage a single stop, which may be in the form of a U-shaped spring, which is partially compressed, and which has two pivoted, high strength plastic members against which the stop surfaces of the head positioner rotor impinge. The plate may also be provided with a notch into which the armature of an electromagnet fits so that the head positioner rotor is locked in the position with the heads adjacent the drive spindle, when the drive is turned off. When the rotor is energized, and the disks get up to speed, the electromagnetic is energized, and the head positioner rotor is freed to move to a selected track for reading or writing digital information.

10 Claims, 3 Drawing Sheets

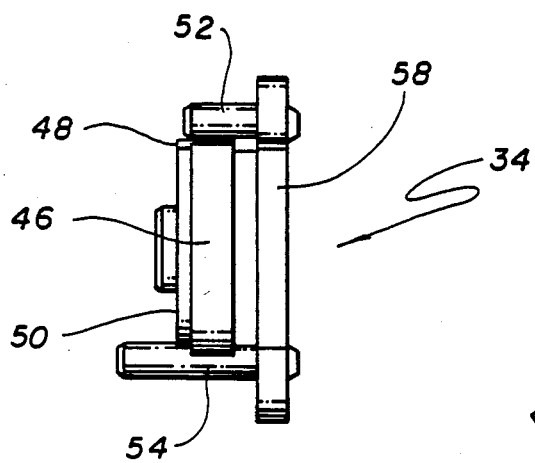
FIG. 6
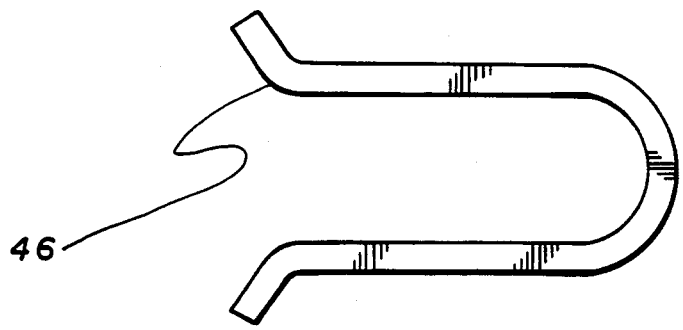
FIG. 7
FIG. 8  SPRING COMPRESSION
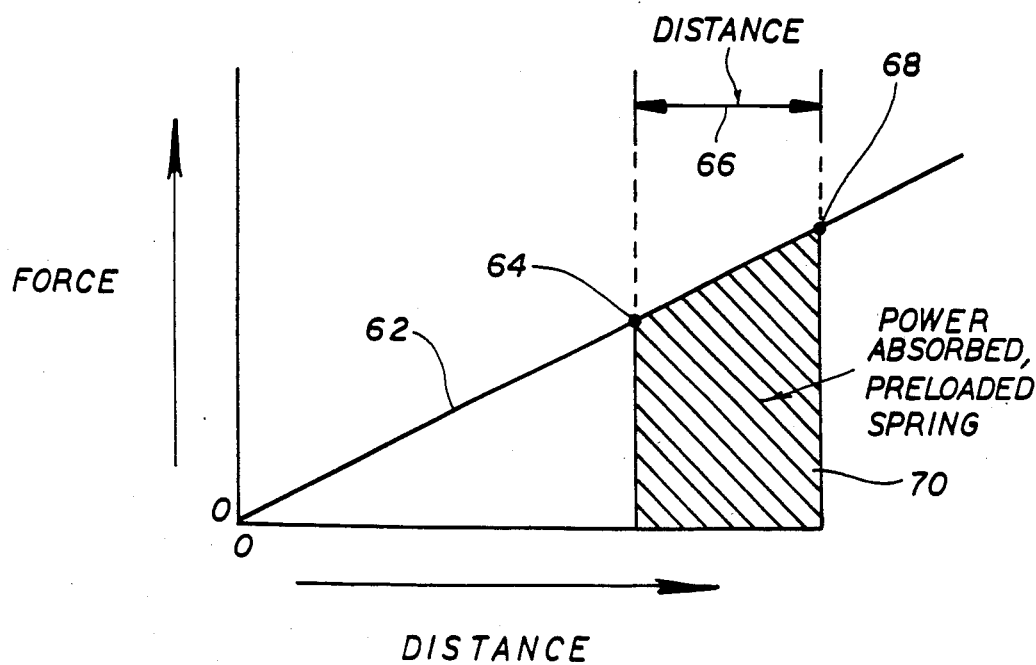

HEAD POSITIONER PRELOADED STOP

FIELD OF THE INVENTION

The present invention relates to arrangements for stopping or arresting the motion of the head positioner of a Winchester disk drive, without undue shock.

BACKGROUND OF THE INVENTION

In the field of digital storage devices wherein data may be retrieved relatively rapidly, Winchester or hard disk drives are widely used. These units characteristically include a substantial number of hard disks, in a stack, with disks having magnetizable surfaces. These disks are rotated at high speeds, and magnetic heads are moved in a generally radial configuration, with the magnetic heads in close proximity to the disks, to read and write information on the disks. In view of the demands for rapid access time to the data, the head positioners move relatively rapidly to shift the heads from the innermost track to the outermost track and vice versa. With this rapid angular movement of the head positioner, it is useful to have stop arrangements provided which will positively stop the angular rotation of the head positioner, and absorb the energy of rotation, and accomplish this without undue shock in the unexpected event of failure of the servo electronics. So that the drive and the data recorded on the disks can be salvaged by replacing only the electronics, for example, the presence of shock absorbing stop arrangements may prevent damage to the head positioner assembly and to the head mounting arrangements. In addition, the space within a Winchester or hard disk drive is severely limited, so the stop arrangements must occupy minimal volume within the unit.

Accordingly, a principal object of the present invention is to provide compact arrangements for stopping the angular motion of the head positioner of a hard disk drive, without undue shock being applied to the rotatable head positioner, and accomplishing this object in minimal space.

SUMMARY OF THE INVENTION

In accordance with a specific illustrative embodiment of the present invention, a stop for the head positioner of a Winchester drive is bi-directional, in that it may be engaged by stop surfaces on the rotatable head positioner when it rotates to either of two extreme positions, and the stop includes a preloaded spring which is partially compressed, so that additional compression as a result of the impingement of one of the stop surfaces will compress the spring further.

In accordance with additional features of the invention, the spring may be generally U-shaped in its configuration, and may have two pivotal stop members for applying force thereto, so that the same spring is compressed when the stop surfaces of the rotatable head positioner impinge upon these two stops from one direction or from the opposite direction, respectively. Through the use of a U-shaped spring, a long spring member with a relatively high preload may be used, with the spring being operated well below the yield stress point; and this may all be accomplished in a relatively small space.

In accordance with an additional feature of the invention, the stop surfaces on the rotatable head may be provided through the addition of a plate, secured to one end of the head positioner, and this plate may be configured with two radially extending stop surfaces to impinge upon the stop arrangements from opposite directions, when the head positioner is rotating toward its extreme position in one direction, or in the other direction, respectively.

The plate which is secured to the rotatable head positioner may also be provided with a notch or a recess to receive the armature of an electromagnet to hold the head positioner in one extreme position, so that the heads will land on a pre-selected area of the disks when the unit is de-energized.

Other ojects, features, and advantages of the invention will become apparent from a consideration of the following detailed description and from the accompanying drawings.

BRIEF DESCRIPTION OF THE DRAWINGS

FIG. 6 is a view of the stop of FIG. 5 from one side thereof;

FIG. 7 is a top plan view of the U-shaped spring which is included in the stop assembly of FIGS. 5 and 6; and FIG. 8 is a plot showing the power absorbed by compression of the preloaded spring of FIGS. 5 through 7.

DETAILED DESCRIPTION

Figure 1:
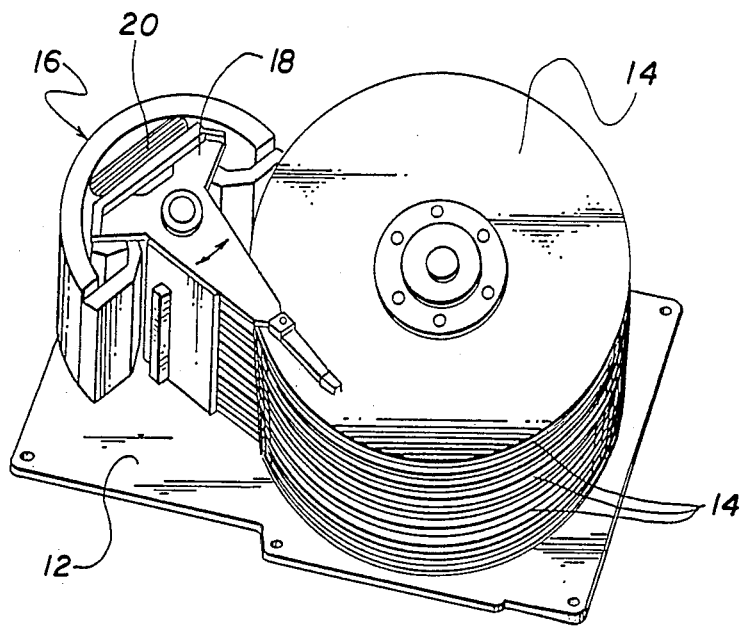
FIG. 1 is a schematic view of a Winchester disk drive showing the rotatable storage disks and the head positioner for the magnetic heads.

Referring more particularly to the drawings, FIG. 1 is a schematic showing of a Winchester disk drive storage system with the cover removed. The storage system of FIG. 1 includes the base plate 12, and the hard disks 14 having magnetizable top and bottom surfaces. The head positioner assembly includes the stationary magnetic structure 16, and the rotatable head positioning portion 18, which rotates in one direction or the other in accordance with the current supplied to the coil 20 which interacts with the magnetic flux of the stationary core 16, in accordance with known techniques. Incidentally, Winchester-type disk drives of the general type shown in FIGS. 1 and 2 of the drawings are sold by Micropolis Corporation, the assignee of the present invention under the Series 1300 and Series 1500 designations.

Figure 2:
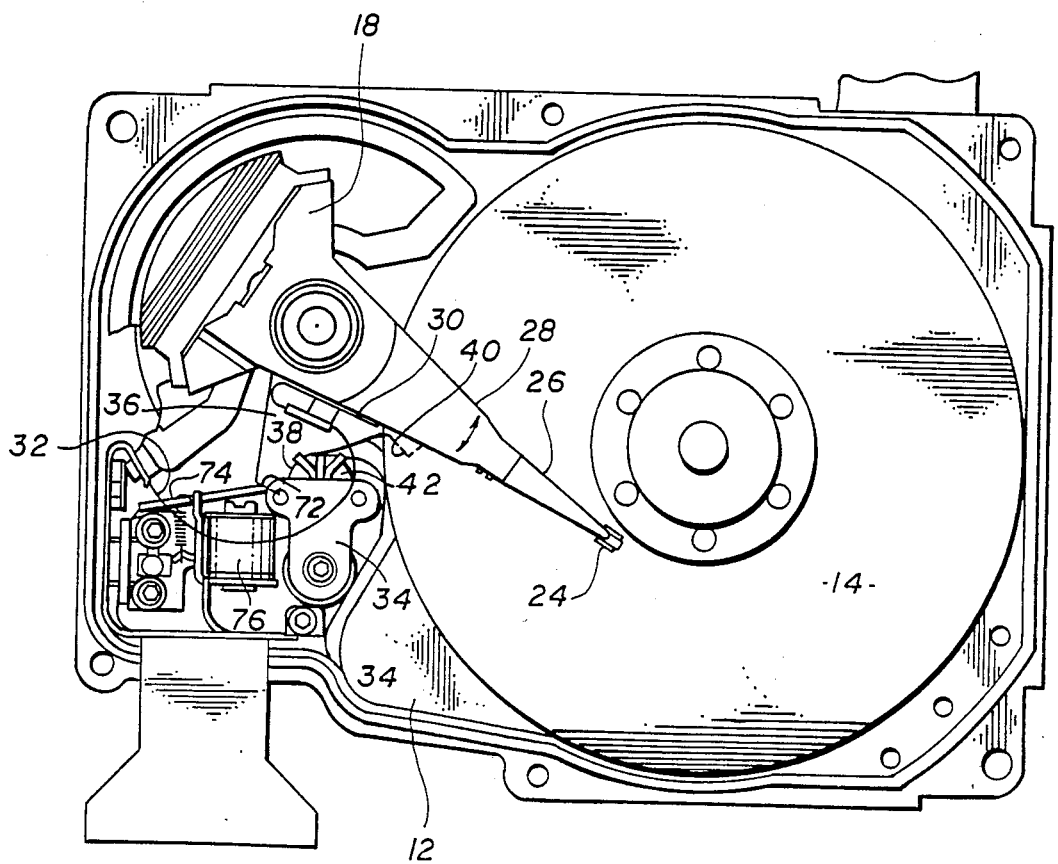
FIG. 2 is a more detailed top plan view of the Winchester disk drive of FIG. 1, and a stop mechanism implementing the principles of the present invention.

Referring now to FIG. 2 of the drawings, some greater detail of some of the structural arrangements is shown. Thus, the magnetic head 24 is shown mounted on the spring arm or load beam 26, which is in turn secured to the integral arm 28 forming part of the rotatable head positioning assembly 18. Electrical signals to and from the heads 24 are coupled through the local electronics on a small printed circuit board 30, and are then coupled to the system electronics through a flexible flat multiconductor cable 32.

Now, turning to the arrangements for stopping the motion of the rotatable head positioning member 18, the bi-directional preloaded stop is shown at reference numeral 34. In addition, a plate 36 which is secured to the bottom of the rotational portion 18 of the head positioner is shown with one of its two stop surfaces 38 in engagement with a portion of the stop assembly 34. The plate 36 has an additional stop surface 40 which engages a rotatable plastic member 42 when the member 18 rotates to its extreme clockwise position as shown in FIG. 2 of the drawings.

Figure 3:
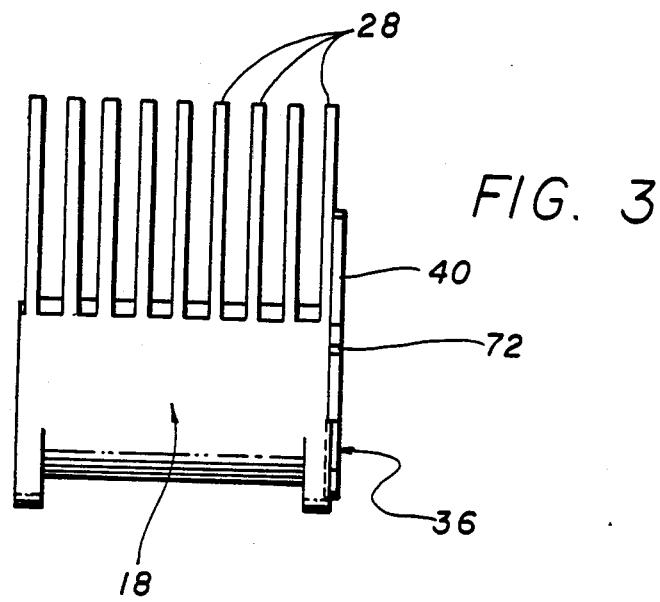
FIG. 3 is a side view of the rotatable head positioner of FIGS. 1 and 2.
Figure 4:
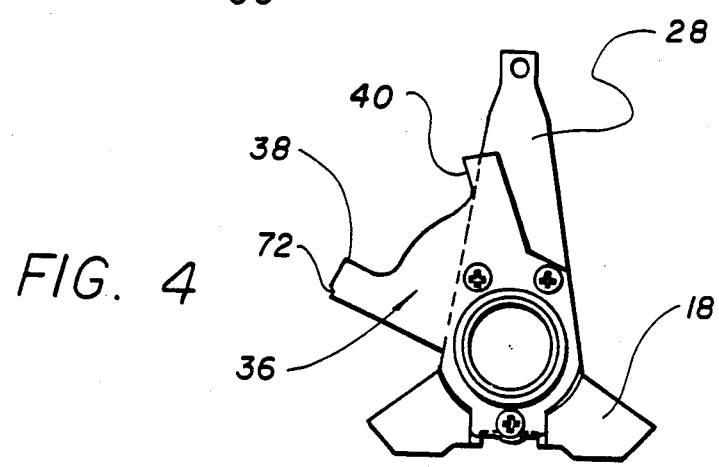
FIG. 4 is a view of one end of the head positioner of FIG. 3, showing the associated plate having stop surfaces which impinge on the bi-directional stop.

The nature of the preloaded bi-directional stop and the plate 36 will be developed further by reference to FIGS. 3 through 7 of the drawings. With reference to FIGS. 3 and 4 of the drawings, these show the core of the member 18 and the position of the plate 36 when it is mounted onto the member 18. The bottom view of FIG. 4 shows the relative angular orientation of the plate 36 and the member 18, with the integral outwardly extending arms 28 also being shown in this figure. The two stop surfaces 38 and 40, which engage the bi-directional stop 34 are also identified in FIG. 4.

Figure 5:
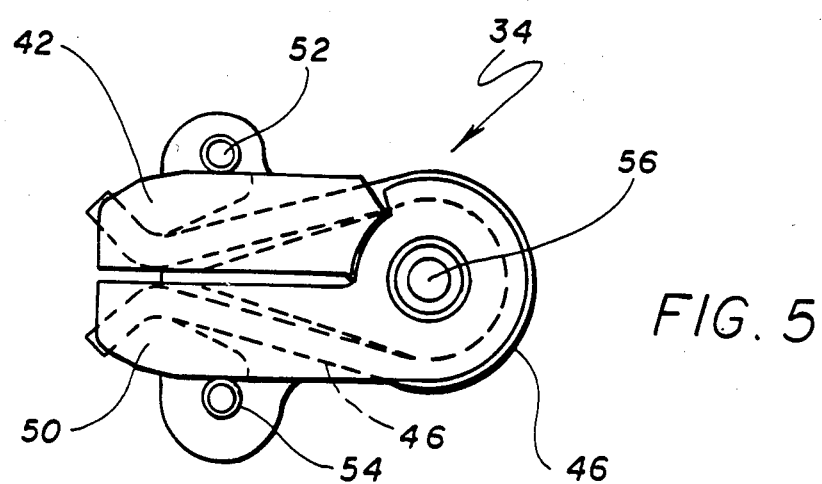
FIG. 5 is a top plan view of a bi-directional stop illustrating the principles of the present invention.

The stop itself is the subject of FIGS. 5 and 6 of the drawings. The basic inner spring 46 is shown by itself in FIG. 7, and in FIGS. 5 and 6, it is included within the assembly. Two separate plastic stop members 48 and 50 bear on the U-shaped spring member 46 and hold it in the pre-compressed, or preloaded condition, with the aid of the fasteners 52 and 54, against which the spring 46 forces the pivotal members 48 and 50. Incidentally, these two plastic members 48 and 50 are made of high strength plastic material, and both of them are pivoted about the point 56. Incidentally, the plastic members 48 and 50 have interfitting and overlapping configurations, whereby the spring 46 rides on the outer surface of one of the plastic members, and the other is pivoted immediately above the spring. Incidentally, the entire assembly is mounted on a base plate 58, which is in turn secured to the base plate 12 of the disk drive.

In practice, when the surface 38 on plate 36 swings toward the bi-directional stop 34, it engages the high strength plastic member 50 and compresses the U-shaped spring additionally beyond its initial precompressed state. Similarly, when the head positioning member 18 swings in the opposite direction, the surface 40 engages the high strength plastic member 42, and a similar compression of the spring 46 occurs, arresting the motion of the member 18, with little shock.

The diagram of FIG. 8 shows the nature of spring compression, with the linear characteristic 62 indicating the normal force versus distance characteristic of a linear spring. In the present case, the preloading or pre-compression of the spring brings the characteristic to the point 64 on the characteristic 62. The further compression of the spring is indicated by the line 66. The power absorbed as the spring is further compressed from point 64 to point 68 is indicated by the area 70 under the characteristic 62. Accordingly, for a given distance 66, substantially more power is absorbed, using the preloaded spring, than would be the case if the spring were not preloaded, or pre-compressed. By employing a preloaded spring, the desired energy absorption may be accomplished in a relatively short space, thus decelerating the rotor 18 rapidly, and in a short distance.

Returning to FIGS. 2 and 4 of the drawings, it may be noted that the plate 36 has a small notch 72 at one corner thereof. As shown in FIG. 2 of the drawings, when the drive disks 14 are not rotating, the heads 24 are moved to the inner portion of the disk 24 where they "land" or engage the surface of the disk. Under these conditions, the armature 74 of the electromagnet 76 has its outer end engage the recess 72 on the plate 36, holding the rotor 18 against rotation. After the disks are rotating at full rated speed, the heads 24 "fly" a small distance above the surface of the associated disks, and the electromagnet 76 is energized, drawing the magnetic armature 74 away from the recess 72 in the plate 36, and permitting the rotor 18 freedom to locate the heads 24 in any desired track across the surface of the disks 14.

It is to be understood that the foregoing detailed description relates to one illustrative embodiment of the invention. The present invention may also be implemented by other arrangements which accomplish the same function, including the use of a resilient member other than a U-shaped spring, and for specific example, using stop surfaces on the head positioning rotor which are integral therewith, rather than being on a separate plate secured to the rotor. Accordingly, the present invention is not limited to the precise arrangements as shown in the drawings, and as described in detail hereinabove.

What is claimed is:

1. A Winchester drive storage system having a magnetic head positioner, including a preloaded bidirectional stop for the magnetic head positioner of the drive, comprising:

a Winchester type disk drive including a plurality of hard storage disks each having magnetizable surfaces and means for rotating said disks;

head positioning means for positioning magnetic heads adjacent said magnetizable surfaces to read and write digital information with respect to said disks in selected tracks across the surface of the disks; said head positioning means including a rotor;

means for stopping the angular motion of the head positioning rotor for both directions of rotation thereof; and said stopping means including a generally U-shaped spring, means for partially pre-compressing said spring, first pivotally mounted plastic stop means for engaging said spring and further compressing substantially the entire length of said U-shaped spring when said first stop means is engaged by said rotatable head positioning rotor in one direction of rotation thereof; and second pivotally mounted plastic stop means for engaging said spring and further compressing substantially the entire length of said U-shaped spring when said second stop means is engaged by said head positioning rotor in the opposite direction of rotation thereof.

2. A Winchester type disk drive as defined in claim 1 wherein said head positioning rotor includes first and second angularly spaced stop surfaces for engaging said first and second pivotally mounted stop means, respectively, when said head positioning means reaches its extreme clockwise or counterclockwise positions, respectively.

3. A Winchester type disk drive as defined in claim 1 wherein said pivotally mounted stop means are formed of high strength plastic material.

4. A Winchester type disk drive as defined in claim 2 wherein said head positioning rotor has a plate affixed thereto, and said first and second stop surfaces are located on said plate.

5. A Winchester type disk drive as defined in claim 4 wherein said head positioning rotor has a predetermined axis of rotation and wherein said plate extends substantially perpendicular to said axis of rotation.

6. A Winchester drive storage system having a magnetic head positioner, including a preloaded bidirectional stop for the magnetic head positioner of the drive, comprising:

a Winchester type disk drive including a plurality of hard storage disks each having magnetizable surfaces and means for rotating said disks;

head positioning means for positioning magnetic heads adjacent said magnetizable surfaces to read and write digital information with respect to said disks in selected tracks across the surface of the disks; said head positioning means including a rotor;

means for stopping the angular motion of the head positioning rotor for both directions of rotation thereof;

said stopping means including a generally U-shaped spring, means for partially pre-compressing said spring, first pivotally mounted plastic stop means for engaging said spring and further compressing substantially the entire length of said U-shaped spring when said first stop means is engaged by said rotatable head positioning rotor in one direction of rotation thereof; and second pivotally mounted plastic stop means for engaging said spring and further compressing substantially the entire length of said U-shaped spring when said second stop means is engaged by said head positioning rotor in the opposite direction of rotation thereof; and said system including mounted means for said U-shaped spring for holding said spring in engagement with said first and second plastic stops adjacent the ends of said spring and for permitting motion of said U-shaped spring throughout its length intermediate the points of engagement with said stops.

7. A Winchester type disk drive as defined in claim 6 wherein said head positioning rotor includes first and second angularly spaced stop surfaces for engaging said first and second pivotably mounted stop means, respectively, when said head positioning means reaches its extreme clockwise or counterclockwise positions, respectively.

8. A Winchester type disk drive as defined in claim 6 wherein said pivotably mounted stop means are formed of high strength plastic material.

9. A Winchester type disk drive as defined in claim 7 wherein said head positioning rotor has a plate affixed thereto, and said first and second stop surfaces are located on said plate.

10. A Winchester type disk drive as defined in claim 9 wherein said head positioning rotor has a predetermined axis of rotation and wherein said plate extends substantially perpendicular to said axis of rotation.

* * * * *